United States Patent [19]

Esposito et al.

[11] 4,316,868
[45] Feb. 23, 1982

[54] EXTRUDING COLORED THERMOPLASTIC RESIN SHEETS

[75] Inventors: Robert A. Esposito, Granby; Frederick F. Valego, Jr., Monson; John C. Hoagland, Longmeadow, all of Mass.

[73] Assignee: Monsanto Company, St. Louis, Mo.

[21] Appl. No.: 207,323

[22] Filed: Nov. 17, 1980

[51] Int. Cl.³ ............................................. B29F 3/10
[52] U.S. Cl. ................................. 264/171; 264/1.3; 264/345; 425/131.1; 425/133.5; 425/462
[58] Field of Search ................. 264/171, 245, 1.3, 1.6; 425/131.1, 133.5, 462

[56] References Cited

U.S. PATENT DOCUMENTS

| | | | |
|---|---|---|---|
| 1,989,371 | 1/1935 | Land | 264/1.3 |
| 3,097,058 | 7/1963 | Branscum et al. | 264/245 |
| 3,354,025 | 11/1967 | Aykanian et al. | 264/171 |
| 3,405,425 | 10/1968 | Buckley et al. | 274/171 |
| 3,444,031 | 5/1969 | Schrenk | 264/1.6 |
| 3,471,898 | 10/1969 | Krystof | 425/131.1 |
| 3,513,060 | 5/1970 | Krystof | 264/171 |
| 3,540,964 | 11/1970 | Nauta | 264/171 |
| 3,608,013 | 9/1971 | Ingham | 264/171 |
| 3,715,420 | 2/1973 | Kiyono et al. | 264/171 |
| 3,799,718 | 3/1974 | Kiyono et al. | 425/131.1 |

*Primary Examiner*—Jeffery R. Thurlow
*Attorney, Agent, or Firm*—David Bennett; William J. Farrington; Paul D. Matukaitis

[57] ABSTRACT

The invention relates to a process and apparatus for producing a colored band in an extruded thermoplastic sheet. In the process, a probe is inserted in a sheet extrusion die manifold and a colored melt is injected into the polymer melt such that a sheet with an encapsulated colored band is obtained.

12 Claims, 7 Drawing Figures

EXTRUDING COLORED THERMOPLASTIC RESIN SHEETS

BACKGROUND OF THE INVENTION

This invention relates to a process for producing an extruded sheet of a thermoplastic resin material and to an apparatus for producing such a product.

The production of transparent thermoplastic sheets by an extrusion process is very well known in general terms and it is also known to add carefully controlled amounts of a dye or a pigment to confer on the sheet any desired hue. It is however somewhat more difficult to produce a transparent sheet with a gradient band of color therein. One specific end-use for which plastic sheets with such color bands are needed is in the production of interlayers for laminated car windshields. Such windshields usually comprise a layer of plasticized polyvinyl butyral [PVB] sandwiched between glass sheets. A popular option in an automobile is a windshield in which the upper region has a colored gradient band so as to reduce the intensity of the sunlight shining through that portion of the windshield and on to the driver and front seat passengers. This colored gradient band shades gradually down to the dominant hue of the rest of the windshield.

The present invention provides a means of producing a plastic sheet having a gradient color band and although its use is not so closely restricted, its main utility is in the production of a gradient color band in a PVB interlayer for an automobile windshield.

DISCUSSION OF THE PRIOR ART

A colored band on a thermoplastic sheet material can be obtained by applying an ink material to the sheet surface under appropriately controlled conditions. Techniques that have been used include printing, dipping and spraying using a wide variety of apparatus. Such methods all share one drawback: the ink has to be dried before the sheet can be wound into a roll or otherwise treated to avoid ink "strike-off" on to the contiguous plies on the roll.

Some techniques have been devised for circumventing these problems and these typically involve coextrusion of a colored plastic with a transparent plastic. For example U.S. Pat. No. 3,354,025 discloses a plastic sheet having a wedge of pigmented plastic inside a pellucid plastic so as to give a gradient color band inside the sheet. A process and apparatus for extruding a colored plastic band inside a pellucid plastic is also described in U.S. Pat. No. 3,405,425. U.S. Pat. Nos. 3,715,420 and 3,799,718 describe a related co-extrusion concept.

It is found however that such coextrusion techniques are very difficult to control in practice, particularly where a gradient color band such as is desired for use in interlayers for automobile windshields is the goal. It is a characteristic requirement for such interlayers that the quality be extremely even with no color variations apart from the gradual diminution of optical density towards the cut-off area. Moreover the location of the cut-off must be the same right across the sheet. Thus variations in polymer melt flow through the extrusion device must be avoided. This gives rise to formidable control problems.

A process has now been devised in which such difficulties are substantially reduced giving a process that is relatively easy to control, is capable of giving a uniform gradient product and does not give rise to internal stresses as a result of the combination of slightly different plastic melt flows.

DESCRIPTION OF THE INVENTION

Figure 1:
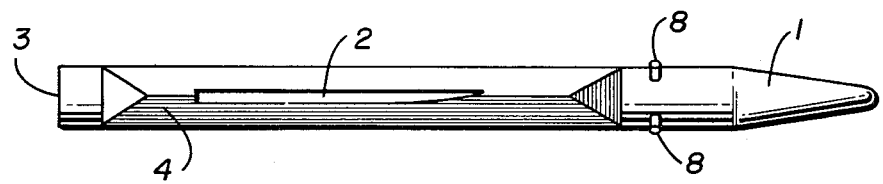
FIG. 1 is an elevation of a probe useful in the process of the invention.

The present invention comprises a process for the extrusion of a pellucid sheet of a thermoplastic polymer with a gradient color band incorporated therein. The process which is now described with reference to the apparatus shown in the drawings comprises:

(a) providing a sheet extrusion die having a slit die orifice (9) and a manifold (6) adapted to feed a polymer melt to said orifice by way of an extrusion passage (7);

(b) providing a generally torpedo-shaped probe (1) located eccentrically within the manifold and adjacent the extrusion passage with the axis of the probe parallel to the slit die orifice, said probe having in the surface adjacent the extrusion passage, a wedge-shaped extrusion orifice (2) that extends parallel to the probe axis for less than half of the width of the extrusion passage and being located in such a position that, when a thermoplastic polymer is fed into the manifold and extruded through the slit die by way of the extrusion passage, the stream lines of the polymer flow as it passes by the wedge-shaped orifice in the probe are substantially parallel and in the direction of extrusion;

(c) feeding a main flow of molten thermoplastic polymer to the manifold and a colored secondary flow of the same polymer at substantially the same temperature and viscosity to the probe;

(d) extruding both flows simultaneously such that a layer of colored polymer (10) that is constant in width is completely encapsulated in the main flow of molten polymer fed to the extrusion manifold; and (e) extruding the combined flows through the slit die to produce a sheet with a gradient color band.

The invention also comprises an apparatus for performing such a process and a preferred embodiment of that apparatus is now further described with reference to the attached drawings which are for the purpose of illustration only and are intended to imply no essential limitation or restriction on the scope of the invention.

The device illustrated in FIG. 1 comprises a probe, 1, with a roughly torpedo-shape and having a wedge-shaped orifice, 2, in the side with the long axis of the orifice parallel to the axis of the body member. The orifice configuration is constant thickness for about 75% of its width and then tapers over the remaining 25% of its width. The orifice is oriented with its thickest end adjacent the inlet end, 3, of the probe and extends about 40% of the total probe length. While the probe still has a general torpedo shape the portion of the surface bearing the extrusion orifice is provided with a wing-extension, 4, such that, in the vicinity of the orifice, the probe has a pear-shaped cross-section with the orifice at the top i.e. at the tip of the wing. The wing-extension terminates short of a pair of legs, 8, projecting axially from the probe adjacent the tapered end. These are designed to rest on the inner surface of the manifold and help maintain the probe in position.

Figure 2:
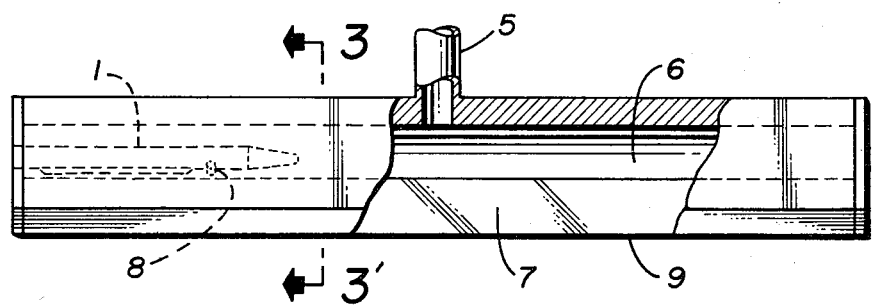
FIG. 2 is a simplified view of a sheet extrusion die useful in the process of the invention showing the probe (in broken lines) in position.

FIG. 2 shows, in broken lines, the position of the probe in a simplified T-bar extrusion device comprising a feed pipe, 5, communicating with a manifold, 6, which in turn communicates with an extrusion passage, 7, and ends in a slit die orifice, 9.

The probe is supported on legs, 8, within the manifold with the wedge-shaped orifice aligned with the entry to the extrusion passage. The probe is also located at the portion of the manifold furthest removed from the feed pipe, 5.

Figure 3:
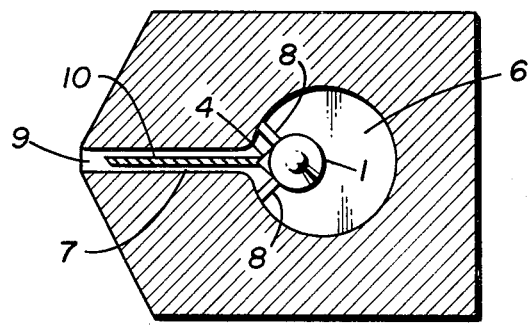
FIG. 3 is a cross-section of sheet extrusion die in use in the process of the invention and illustrating a preferred position of the probe in the manifold.

FIG. 3, which is a cross-section along line 3, 3' of FIG. 2, illustrates the preferred position of the probe in the manifold.

Figure 4:
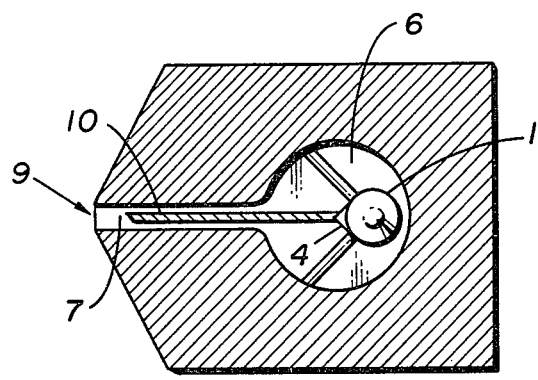
FIG. 4 is an end view of an operating sheet extrusion die similar to that shown in FIG. 3 except that the probe is located in an unsuitable position.

FIG. 4 however illustrates the configuration to be avoided in which the probe is moved further back in the manifold where some flow transverse to the direction of extrusion is occurring.

The probe can have any configuration consistent with the intention that the stream lines of the main polymer flow as it passes the wedge-shaped extrusion orifice in the probe remain substantially parallel and in the direction of extrusion. The critical part of the probe is the portion containing the wedge shaped extrusion orifice since non parallel stream lines at that point will tend to distort the shape of the colored extrudate band. It is desirable then that the probe be shaped so as to get the orifice as close as possible to the extrusion passage without forming a choke at that point. A probe configuration that contains a projection in the form of a wing extension along a major portion of the axial length of the probe and extending in the direction of extrusion with the orifice located at the extremity or tip of the wing extension is particularly preferred. With such a configuration the projection can get very close to the extrusion passage without significantly obstructing the main flow.

The orifice in the probe is wedge-shaped but this is not intended to imply that the orifice necessarily has a triangular configuration. In fact in a preferred configuration the thickness of the orifice is constant over much of its width before tapering at one end. The tapering can be in straight-line fashion but more frequently the taper is shaped to give a color fade-off, when the gradient band is observed in the finished sheet, that is more aesthetically pleasing.

The orifice generally has a width that is less than the length of the probe. Often the orifice extends for from 30 to 50% of the total length of the probe inside the manifold and produces a color band that is less than half the width of the extruded sheet and preferably from 5 to 30% of that width.

The probe is located at a point in the manifold at which the stream-lines of the main flow as it passes the wedge-shaped extrusion orifice in the probe are substantially parallel and in the direction of extrusion.

When a main flow is fed through a feed pipe into a manifold communicating with a slit die orifice by means of an extrusion passage the stream lines are initially divergent from the feed pipe as the polymer spreads to fill the manifold. However a conventional slit die extrusion device is so designed that, as the polymer to be extruded flows through the extrusion passage, it flows at substantially the same rate across its full width, that is, so that the flow lines of the polymer in the extrusion passage are substantially parallel and in the direction of extrusion. Parallel flow is then reached close to the entry of the extrusion passage proper and as indicated above this is the preferred location of the probe orifice.

Clearly however the probe location is in part controlled by the relative dimensions of the probe and the extrusion passage. Since the sheet produced must comprise the colored secondary flow extruded through the probe encapsulated within the main flow fed into the manifold, the flow around the probe must not be cut-off. At the same time the probe must not be set far enough back inside the manifold that, at the point at which the colored polymer exits the probe it encounters the main flow that is still spreading to fill the manifold and hence has stream lines that are not in the direction of extrusion. If this happens the flow is distorted and the result is a narrowing of the colored band and a distortion of the gradient effect obtained when the process is operated according to the invention. It is of the essence of the present invention that the colored band in the extruded sheet is substantially the same width as the wedge shaped orifice in the probe and this can only be achieved if, at the point the polymer flows contact one another, the stream lines of the main flow are substantially parallel and in the direction of extrusion.

The probe is preferably inserted into the manifold at point remote from that at which polymer enters the manifold. In a conventional T-bar die a single probe may be inserted into either end of the T-bar and a similar location is appropriate for a "fish-tail" or "coat hanger" die configuration. Alternatively two probes could be used in such dies: one inserted at each end of the manifold. In an end-fed die, a single probe may be located at the end opposite that through which the polymer is fed.

Where the extrusion passage is provided with a central choke device to aid spreading of polymer it is desirable that the secondary flow of colored polymer from the probe pass to one side of the device to avoid distortion.

In practice the probe can extend up to 75% or preferably up to 25% of the width of the extrusion passage. Since the preferred configuration places the narrowest point of the wedge-shaped orifice adjacent the probe tip this will result in a polymer sheet with a color band with its greatest density adjacent the edge of the sheet and fading off towards the middle of the sheet when viewed from above. Such a sheet is ideally configured for the production of car windshield interlayers.

The temperature and viscosity of the colored melt extruded through the probe are substantially the same as those of the main flow fed to the manifold. It is however intended that this term should embrace variations of temperature and viscosity between the two streams of up to 10% since no significant adverse effects result therefrom.

The velocity of the two streams at the point of first contact may however differ significantly if desired. It is found that if the colored secondary melt flow is extruded at a faster velocity a thicker band is obtained than if the velocities are matched. Thicker bands are often advantageous since it permits a lower color-density melt to be used to achieve the same color density in the resulting sheet. A preferred feature of the present invention therefore is to extrude the colored secondary melt flow at a velocity that is up to twelve times and preferably from 5 to 10 times greater than that of the main polymer melt flow as it first contacts the colored melt.

The resulting gradient band, at its thickest point can represent from 15 to 95% of the total thickness of the sheet and preferably from 60 to 90% of the thickness.

The polymer extruded through the probe can be dyed or pigmented to produce the desired color. The pigment should be adequately dispersed at all times to give the best results. Which is used, dye or pigment, is largely a matter of convenience and is of no significance to the basic concept.

The main flow fed into the manifold can also be colored though it would defeat an important purpose of the invention if both the main flow and the colored secondary flow were colored to the same density. It is therefore preferred that the main flow be clear or of a substantially lower color density than that fed to the probe.

The polymer that is used to form the sheet can be any thermoplastic polymer that is capable of being extruded through a sheet die. Such polymers include polyacrylics, polystyrenics, polyvinyl esters or halides, polyesters, polyurethanes and polyvinyl acetals. In view of the utility of the process for the production of gradient-colored windshield interlayers, the preferred polymer is a plasticized polyvinyl butyral of the type conventionally used in laminated safety glass.

The criticality of the positioning of the probe can be illustrated using a transparent die and liquids whose relative rheological properties are adjusted to match those of actual polymer melts with which the process of the invention is used.

Figure 5:
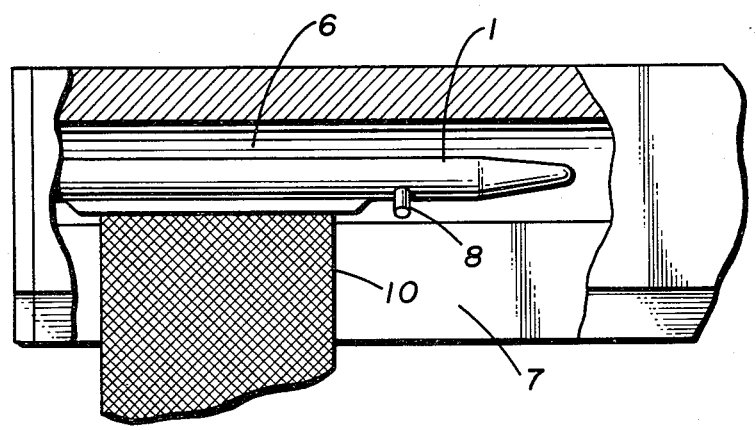
FIGS. 5 to 7 are drawings taken from photographs of the flow of a colored liquid through a transparent device simulating a sheet extrusion die of the kind useful in the process of the invention.
Figure 6:
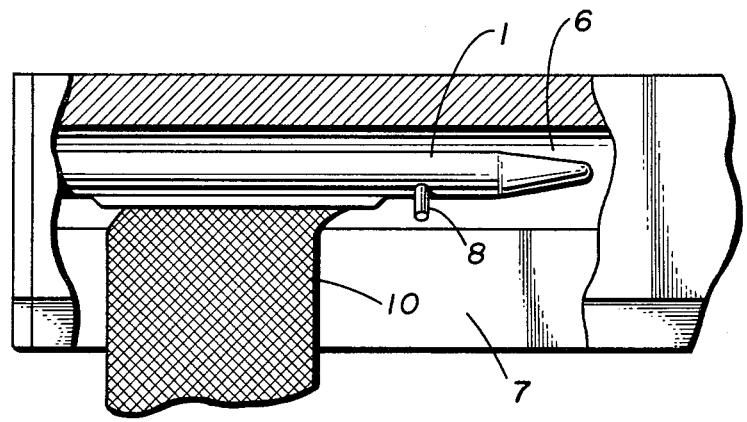
Figure 7:
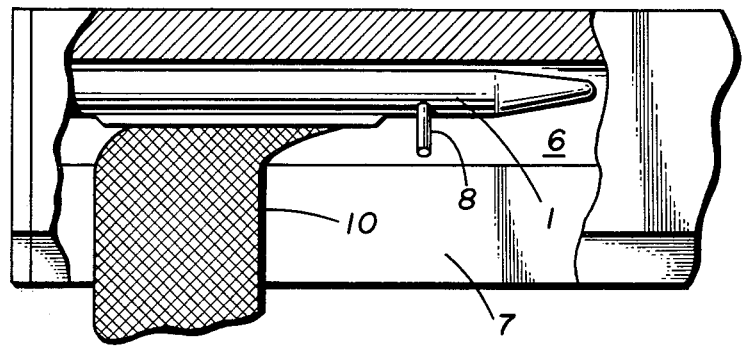

A transparent die was constructed with a configuration much like that in FIGS. 2 and 3. The probe was moved to various positions and in each case a colored liquid was pumped through it such that the flow became encapsulated within a clear flow of the same liquid fed into the manifold and extruded through the slit die orifice, 9. FIGS. 5 to 7 are drawings taken from photographs of the change in pattern of the colored stream, 10, as the probe position was moved with respect to the entry to the extrusion passage. FIG. 5 shows the flow pattern corresponding to the configuration in FIG. 2. FIG. 7 shows what happens with the FIG. 4 configuration and FIG. 6 shows an intermediate position and the distortion that results therefrom. Placement of the probe too far back results in a distorted gradient which does not retain the gradual fade-off feature required if the sheet is to be used as an automobile interlayer.

EXAMPLE

The following is an Example illustrating the operation of the process of the invention to produce a polyvinyl butyral sheet having an encapsulated gradient band along one edge.

An extrusion device substantially as described in relation to FIGS. 1 to 3 except for the use of an end-fed manifold was used. The probe extended about 50 cm into the manifold and the total length (perpendicular to the direction of extrusion) of the extrusion passage was about 76 cm. The extrusion orifice in the probe was 16.5 cm in length.

Clear polyvinyl butyral melt was fed to the manifold through the feed pipe at a temperature of 204° C. and a flow rate through the extruder of 136 kg/hr.

Colored polyvinyl butyral was fed to the probe at a temperature of 193° C. and a flow rate through the probe of 18 kg/hr.

A sheet was obtained with an encapsulated gradient band having excellent uniformity of appearance along the sheet and a width that closely approximated the width of the extrusion orifice in the probe.

It is foreseen that many variations could be made in the devices described and illustrated herein without departing from the essential scope of the invention. It is intended that all such variations be embraced within the purview of this invention.

What is claimed is:

1. A process for the extrusion of a pellucid sheet of a thermoplastic polymer with a gradient color band incorporated therein which comprises:
    (a) providing a sheet extrusion die having a slit die orifice and a manifold adapted to feed a polymer melt to said orifice by way of an extrusion passage;
    (b) providing a generally torpedo-shaped probe located eccentrically within the manifold and adjacent the extrusion passage with the axis of the probe parallel to the slit die orifice, said probe having in the surface adjacent the extrusion passage, a wedge-shaped extrusion orifice that extends parallel to the probe axis for less than half of the width of the extrusion passage and being located in such a position that, when a main flow of a thermoplastic polymer is fed into the manifold and extruded through the slit die by way of the extrusion passage, the stream lines of the main flow as it passes by the wedge-shaped orifice are substantially parallel and in the direction of extrusion;
    (c) feeding a main flow of molten thermoplastic polymer to the manifold and a colored secondary flow of the same polymer, at substantially the same temperature and viscosity, to the probe;
    (d) extruding both flows simultaneously such that a layer of colored polymer that is constant in width but tapering in thickness at one extremity of its width, is completely encapsulated in the main flow of molten polymer; and
    (e) extruding the combined flows through the slit die to produce a sheet with an encapsulated gradient color band.

2. A process according to claim 1 in which the probe is inserted into the manifold at a point remote from that at which the main flow of molten polymer enters the manifold.

3. A process according to claim 1 in which the probe extends up to 25% of the width of the extrusion passage.

4. A process according to any one of claims 1 to 3 in which the orifice in the probe has a portion, adjacent the end through which the melt enters, that is of constant thickness, and a portion adjacent the opposed end that is tapered.

5. A process according to any one of claims 1 to 3 in which the velocity of the extruded colored melt is up to twelve times greater than that of the main flow at the point the flows contact one another.

6. A process according to any one of claims 1 to 3 in which the molten thermoplastic is polyvinyl butyral.

7. A process for the extrusion of a pellucid sheet of plasticized polyvinyl butyral with a gradient color band incorporated therein which comprises:
    (a) providing a sheet extrusion die having a slit die orifice and a manifold adapted to feed a polymer melt to said orifice by way of an extrusion passage;

(b) providing a generally torpedo-shaped probe located eccentrically within the manifold and adjacent the extrusion passage with the axis of the probe parallel to the slit die orifice said probe having a wedge-shaped extrusion orifice that extends for about 30 to 50% of the length of the probe and being located adjacent the entry of the extrusion passage in such a position that, when a main flow of molten polyvinyl butyral is fed into the manifold and extruded through the slit die by way of the extrusion passage, the stream lines of the polymer as it passes the wedge-shaped orifice in the probe are substantially parallel and in the direction of extrusion;

(c) feeding a main flow of molten polyvinyl butyral to the manifold and a colored secondary flow of the same polymer at substantially the same temperature and viscosity to the probe;

(d) extruding both flows simultaneously but at different velocities such that a layer of colored polyvinyl butyral completely encapsulated in the main flow of molten polymer is obtained, said layer being constant in width but tapering in thickness at one extremity of its width; and (e) extruding the combined flows through the slit die to produce a sheet with an encapsulated gradient color band that represents, at its thickest, from 15 to 95% of the total thickness of the sheet.

8. An apparatus for the production of a pellucid sheet of a thermoplastic polymer with a gradient color band encapsulated therein which comprises:

(a) a sheet extrusion die having a slit die orifice and a manifold adapted to feed a polymer melt to said orifice by way of an extrusion passage; and (b) a generally torpedo-shaped probe located eccentrically within the manifold adjacent the extrusion passage, with its long axis parallel to the slit die orifice, said probe having in the surface adjacent the extrusion passage, a wedge-shaped extrusion orifice that extends parallel to the probe axis for less than half the width of the extrusion orifice and being located in such a position that when a thermoplastic polymer is fed into the manifold and extruded through the slit die by way of the extrusion passage, the stream lines of the polymer flow as it passes by the wedge-shaped orifice in the probe are substantially parallel and in the direction of extrusion.

9. An apparatus according to claim 8 in which the probe is inserted into the manifold at a point remote from that at which the main flow of molten polymer enters the manifold.

10. An apparatus according to claim 8 in which the probe extends up to 25% of the width of the extrusion passage.

11. An apparatus according to any one of claims 8 to 10 in which the orifice in the probe has a portion, adjacent the end through which the melt enters, that is of constant thickness, and a portion adjacent the opposed end that is tapered.

12. An apparatus for the extrusion of a pellucid sheet of a thermoplastic polymer with a color band incorporated therein which comprises:

(a) a sheet extrusion die having a slit die orifice and a manifold adapted to feed a polymer melt to said orifice by way of an extrusion passage; and (b) a generally torpedo-shaped probe located eccentrically within the manifold and adjacent the extrusion passage with the axis of the probe parallel to the slit die orifice, said probe extending up to 25% of the width of the extrusion passage and having a wedge shaped orifice that extends for 30 to 50% of the length of the probe and has substantially parallel sides for up to 75% of its width before tapering to provide the wedge shape over the remainder of its width, said probe orifice being located adjacent the entry of the extrusion passage in such a position that, when a main flow of molten thermoplastic polymer is fed into the manifold and extruded through the slit die by way of the extrusion passage, the stream lines of the polymer as it passes the wedge-shaped orifice in the probe are substantially parallel and in the direction of extrusion.

* * * * *